United States Patent
Medvedovsky et al.

(10) Patent No.: US 10,200,382 B2
(45) Date of Patent: Feb. 5, 2019

(54) SYSTEM AND METHOD FOR DETECTING ABNORMAL TRAFFIC BEHAVIOR USING INFINITE DECAYING CLUSTERS

(71) Applicant: RADWARE, LTD., Tel Aviv (IL)

(72) Inventors: Lev Medvedovsky, Netanya (IL); David Aviv, Tel Aviv (IL)

(73) Assignee: RADWARE, LTD., Tel Aviv (IL)

( * ) Notice: Subject to any disclaimer, the term of this patent is extended or adjusted under 35 U.S.C. 154(b) by 502 days.

(21) Appl. No.: 14/933,353

(22) Filed: Nov. 5, 2015

(65) Prior Publication Data

US 2017/0134401 A1    May 11, 2017

(51) Int. Cl.
   *H04L 29/06*   (2006.01)

(52) U.S. Cl.
   CPC ...... *H04L 63/1416* (2013.01); *H04L 63/1425* (2013.01); *H04L 63/1458* (2013.01)

(58) Field of Classification Search
   CPC ............. H04L 63/1416; H04L 63/1425; H04L 63/1433; H04L 63/1458
   USPC .......................................................... 726/23
   See application file for complete search history.

(56) References Cited

U.S. PATENT DOCUMENTS

| | | | |
|---|---|---|---|
| 5,684,892 A | 11/1997 | Taguchi | |
| 7,681,235 B2 | 3/2010 | Chesla et al. | |
| 7,836,496 B2 | 11/2010 | Chesla et al. | |
| 8,073,652 B2 | 12/2011 | Grichnik et al. | |
| 8,566,928 B2 | 10/2013 | Dagon et al. | |
| 9,306,962 B1* | 4/2016 | Pinto | H04L 63/1416 |
| 2006/0230018 A1 | 10/2006 | Grichnik et al. | |
| 2008/0028463 A1* | 1/2008 | Dagon | H04L 29/12066 726/22 |
| 2015/0213246 A1* | 7/2015 | Turgeman | G06F 21/32 726/23 |

OTHER PUBLICATIONS

Angstenberger, "Dynamic Fuzzy Pattern Recognition with Applications to Finance and Engineering", Springer Science Business Media, New York, 2001.
Bayarjargal, et al., "Detecting an Anomalous Traffic Attack Area based on Entropy Distribution and Mahalanobis Distance", International Journal of Security and Its Applications, vol. 8, No. 2, pp. 87-94, 2014.
Blum, "On-line Learning and the Metrical Task System Problem", School of Computer Science, Carnegie Mellon University, Pittsburgh, PA, 1997.
Bottou, "Online Learning and Stochastic Approximations", AT&T Labs-Research, Red Bank, NJ, 1998.

(Continued)

*Primary Examiner* — Eleni A Shiferaw
*Assistant Examiner* — Angela R Holmes
(74) *Attorney, Agent, or Firm* — M&B IP Analysts, LLC

(57) ABSTRACT

A system and method for detecting abnormal traffic behavior. The method comprises: applying a task to an input data set to create an un-normalized cluster of traffic features, wherein the task defines a plurality of traffic features; computing a center point of the cluster of traffic features; computing a distance between the computed center point and a new sample, wherein the new sample includes traffic features defined in the task; and determining, based on the computed distance, whether the received new sample demonstrates abnormal behavior.

21 Claims, 6 Drawing Sheets

(56) References Cited

OTHER PUBLICATIONS

Cesa-Bianchi, "Online Learning of Noisy Data", IEEE Transactions on Information Theory, vol. 57, No. 12, Dec. 2011.
Davis, et al., "Information-Theoretic Metric Learning", Department of Computer Science, University of Texas at Austin, Austin, Texas, appearing in Proceedings of the 24th International Conference on Machine Learning, Corvallis, OR, 2007.
Kliper-Gross, et al., "One Shot Similarity Metric Learning for Action Recognition", A Conference Paper from Lecture Notes in Computer Science, Conference: Similarity-Based Pattern Recognition—First International Workshop, SIMBAD 2011, Venice, Italy, Sep. 28-30, 2011.
Shalev-Shwartz, at al., "Understanding Machine Learning: From Theory to Algorithms", Chapter 16, Cambridge University Press, 2014.
Suthaharan, "A Single-domain, Representation-learning Model for Big Data Classification of Network Intrusion", A Conference Paper; Proceedings of the 9th international conference on Machine Learning and Data Mining in Pattern Recognition, pp. 296-310, 2013.
Suthaharan, "Big Data Classification: Problems and Challenges in Network Intrusion Prediction with Machine Learning", Department of Computer Science, University of North Carolina at Greensboro, 2014.

* cited by examiner

SYSTEM AND METHOD FOR DETECTING ABNORMAL TRAFFIC BEHAVIOR USING INFINITE DECAYING CLUSTERS

TECHNICAL FIELD

This disclosure generally relates to techniques for detecting abnormal network traffic behavior in communication networks, and more particularly to detection of cyber-attacks based on abnormal network traffic behavior using an original infinite decaying clusters approach.

BACKGROUND

Communication infrastructures are now characterized as large-scale networks typically featuring at least two types of networks: an edge (or access) network and a backbone network. The edge network provides network connectivity to user devices or hosts, while the backbone network connects two or more edge networks together. Examples for large-scale networks are cloud computing platforms, data centers, service provider networks, and the like. The architecture of a large-scale network can be constructed as a multi-tiered network including a backbone network in a main (root) tier and a plurality of edge networks in child (branch) tiers that are connected to the main tier. Typically, there is one backbone network and many edge networks that are connected thereto. The edge networks may be connected to each other in a further tiered architecture as well.

Large-scale networks possess various unique properties. One such property is that the network resources can reside in many different places. As an example, for server cloud computing applications, a large number of data centers or servers that are physically remote from each other collaborate to provide services to clients. Further, in the availability of resources in such large-scale networks is dynamic as a result of the changing network condition, network activities, and applications. In addition, services provided by servers and/or data centers are rich and diverse rather than homogeneous.

The unique properties and architecture of large-scale networks pose certain challenges in protecting the network's resources against cyber threats and misuse of network resources. For example, denial of service (DoS) attacks, distributed DoS (DDoS) attacks, and chatty applications are only a few examples of threats that can cause unusual and/or malicious usage of network resources. Challenges arise due to the large number of resources and services included in such a network, the collaboration between resources, and the dynamic services provided by such networks. The complexity of cyber-attacks plays a major role here as DoS/DDoS attacks campaigns are highly sophisticated and aggressive. In addition to DoS and DDoS attacks that may be characterized by known-patterns or prior information on attack campaigns, the network should be protected against other misuse or abnormal usage of network resources. Typically, the direct cause for such disturbances is unknown or otherwise not immediately apparent.

A common feature of all such disturbances or threats is a deviation from normal data traffic behavior. With this in mind, conventional network security systems attempt to learn common traffic patterns and detect any departure from the learned patterns. The existing approaches for learning traffic patterns are based on network layer (layer-4 of the OSI model) traffic analysis on a number of temporal traffic features such as, e.g., a packet rate, a bit rate, an average packet size, etc. The temporal traffic features may be correlated with some uncorrelated traffic features received from upper layer protocols (e.g., an application layer protocol).

Such existing approaches suffer from a number of disadvantages that make them insufficient for the detection of disturbances or threats in large-scale networks. For example, under existing approaches, detection of traffic patterns is based on learning a set of limited common traffic features in the network layer. As a result, such approaches may fail to detect attacks seeking to exploit a network resource for which common traffic features have not yet been learned. In addition, the analysis of features from application layer protocols requires utilization of extensive computing resources typically performed by a dedicated device. Furthermore, the interconnection between network-layer and application-layer traffic features is often performed manually and, thus, cannot be utilized for real-time detection of disturbances or threats. In sum, existing approaches for detecting abnormal traffic patterns are not sufficiently adapted for protecting multi-tiered networks against large-scale attack campaigns.

One solution for modeling behavior in order to predict or otherwise recognize as of yet unlearned traffic features is the information theory metric learning (ITML). Using an ITML model, current traffic states are presented by all their observable features in a multi-variable random process, where momentary temporal feature points form a cluster of an arbitrary shape in a multivariate features space. Typically, use of the ITML model involves estimating a metric which incorporates information about all random points of the cluster, normalizing multivariate random features space with the learned metric, and reducing this space to a standard form. As such, the ITML model involves transforming a stochastically anisotropic cluster into a canonical stochastically isotropic cluster with unit variance in any direction from its center.

However, the existing ITML approach, oriented to stationary random process, is inefficient in case of a non-stationary random process and, in particular, for analysis of data traffic behavior. The traffic behavior is a typical non-stationary stochastic process which, due to traffic, has changeable statistical properties. The model (metric) estimation with a conventional ITML includes, in part, calculation of the covariance matrix of the cluster of random points, with subsequent calculation of the inverse covariance matrix. These procedures are complex and demand significant amounts of computing resources. Additionally, re-evaluating the metric with each new observation (including all previous points) to estimate new covariance between all features-dimensions for each new observation further escalates the demand on computing resource.

Therefore, it would therefore be advantageous to provide an efficient, scalable, and robust solution for modeling traffic behavior.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

Certain embodiments disclosed herein include a method for detecting abnormal traffic behavior. The method comprises: applying a task to an input data set to create an un-normalized cluster of traffic features, wherein the task defines a plurality of traffic features; computing a center point of the cluster of traffic features; computing a distance between the computed center point and a new sample, wherein the new sample includes traffic features defined in the task; and determining, based on the computed distance, whether the received new sample demonstrates abnormal behavior.

Certain embodiments disclosed herein also include a system for detecting abnormal traffic behavior. The system comprises: a processing unit; and a memory, the memory containing instructions that, when executed by the processing unit, configure the system to: apply a task to an input data set to create an un-normalized cluster of traffic features, wherein the task defines a plurality of traffic features; compute a center point of the cluster of traffic features; compute a center point of the cluster of traffic features; compute a distance between the computed center point and a new sample, wherein the new sample includes traffic features defined in the task; and determine, based on the computed distance, whether the received new sample demonstrates abnormal behavior.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
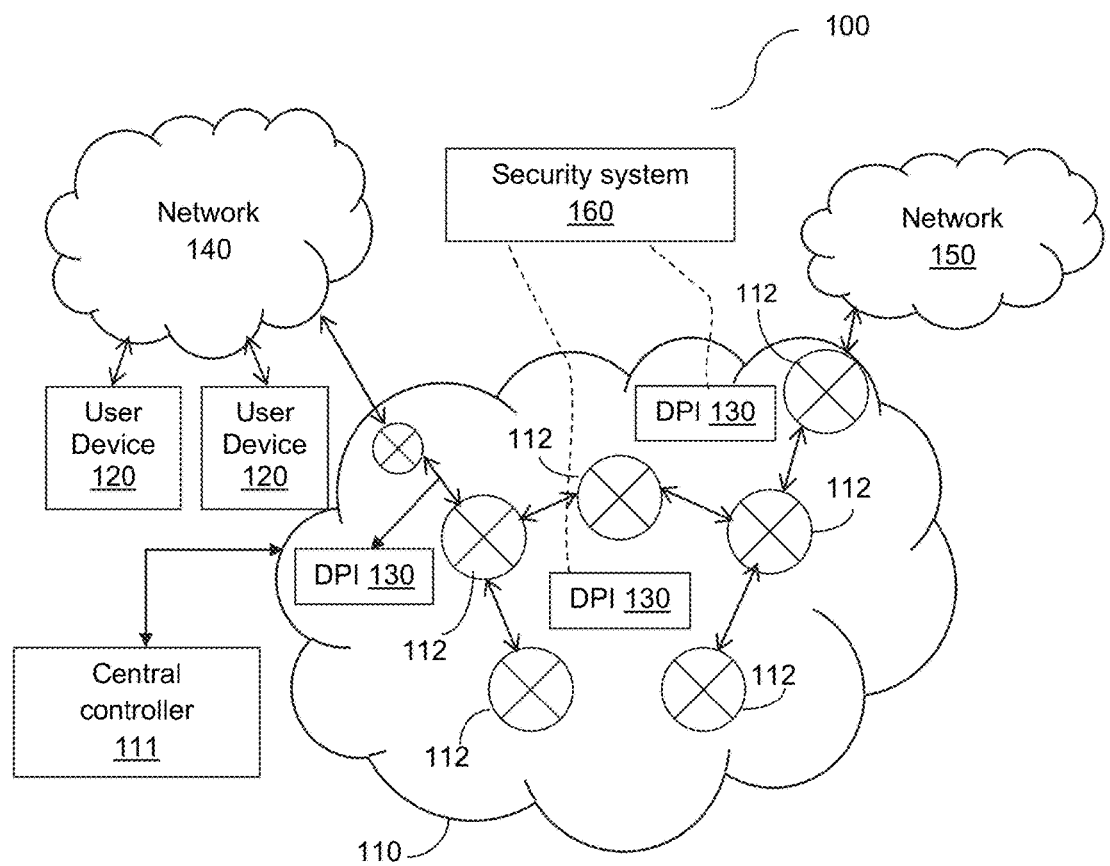
FIG. 1 is a diagram of a large-scale network utilized to describe the various disclosed embodiments.

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an exemplary and non-limiting diagram of a large-scale network 100 utilized to describe the various disclosed embodiments. The large-scale network 100 includes a backbone network 110, edge networks 140 and 150, and a plurality of user devices (hereinafter referred to collectively as user devices 120, merely for simplicity purposes) connected to the network 140. In certain configurations, the large-scale network 100 also includes a plurality of deep packet inspection (DPI) engines 130 (hereinafter referred to individually as a DPI engine 130 and collectively as DPI engines 130, merely for simplicity purposes) utilized to collect statistics, parameters, and/or features of the traffic through the various networks and their elements (e.g., routers, switches, etc.). A DPI engine 130 may be a physical machine and/or a virtual machine. A DPI engine 130 can be deployed as part of the data-plane in a tap mode and configured to monitor the traffic and to classify the traffic per flow. The DPI engines 130 collect and analyze data in real-time.

In an exemplary configuration, the backbone network 110 may be a software defined network (SDN) containing or communicatively connected to a central controller 111 and a plurality of network elements 112. The network elements 112 communicate with the central controller 111 using, for example, an OpenFlow protocol. In a SDN, the central controller 111 is configured to cause the network elements 112 to perform certain data path operations. Further, the central controller 111 is configured to collect statistics, parameters, and/or features of the traffic flows through the network element 120.

The edge networks 140 and 150 are typically external to the backbone network 110 and each may be, for example, a WAN, the Internet, an Internet service provider (ISP) backbone, and the like. The backbone network 110 can be implemented as wide area networks (WANs), local area networks (LANs), service provider backbones, datacenters, inter-datacenter networks, a private cloud, a public cloud, a hybrid cloud, and the like.

A user device 120 may be, for example, a smart phone, a tablet computer, a personal computer, a laptop computer, a notebook computer, a wearable computing device, or any device that can communicate with, for example, the network 140. Each of the user devices 120 is installed with an operating system (OS) and can execute one or more applications (apps).

Applications can access servers or storage systems (not shown) residing in the edge networks 140 and 150 for the purpose of operating the applications. For example, a YouTube® application installed on a user device 120 streams video clips from servers located in the network 150. An application executed or accessed through a user device 120 may be, but is not limited to, a mobile application, a virtual application, a web application, a native application, and the like. It should be noted that all traffic between the edge networks 140 and 150 pass through the network 110.

According to various embodiments disclosed herein, a security system 160 is also commutatively connected to the large-scale network 100. According to the disclosed embodiments, the security system 160 is configured to monitor the traffic directed to a least a protected entity, analyze the traffic, and determine abnormal traffic behavior. The security system 160 is configured to identify and raise alerts regarding cyber-attacks based on the identified abnormal traffic behavior. Such attacks include, but are not limited to, DoS, DDoS, bot activity, chatty activity, and the like.

In an embodiment, the analysis and the detection of abnormal traffic behavior is performed without any comparisons to preliminarily learned or otherwise beforehand known baselines representing normal behavior. To perform such comparisons without using known baselines, the security system 160 is configured to utilize an Infinite Decaying Clusters (iDC) approach with ITML techniques to recognize abnormal behavior.

As will be discussed below, the detection of abnormal traffic behavior is based on the computation of Mahalanobis distance from time-varying clusters of the state points (feature vectors) at the multi-dimensional space, and accordingly updating their metrics. Metrics of multi-dimensional space are generated from a set of an unlimited number of weighted points (feature vectors). In an embodiment, the weights are decreased based on the ages of their respective points. The set of points may be created as "Decaying Clusters" using, for example, Equation 6 detailed below. Thereafter, using the iDC approach in connection with an ITML technique, metrics of the multi-dimensional space are updated using perturbation theory techniques without recalculating the full unlimited set of points. An abnormal behavior is determined based on a Mahalanobis distance between a center point of a cluster and a newly observed sample. Detection of abnormal behavior is discussed in more detail herein below.

The set of traffic features, parameters, and statistics (hereinafter "traffic features") to be analyzed is defined by a task. The security system 160 is configured to aggregate traffic features collected, for example, by the DPI engines 130. Examples for traffic features may include packet rate, packets per second, byte rate, byte per second, average packet size, new connections rate (new connections per second per application), concurrent connections per application (connections per application), average application flow duration, average application flow size, total number of talking sources per application, total number of talking users per application, data symmetry, an application name or identifier (ID) of the application (e.g., Gmail®, Skype®, YouTube®, etc.), an application protocol (e.g., HTTP, SMTP, POP, FTP, etc.), a layer-4 (L4) protocol (e.g., TCP, UDP, etc.), a L4 destination port number, a device type (e.g., Nokia®, iPhone®, Samsung®, etc.), an operating system (OS) type and version (e.g., Symbian®, Win8®, Android®, iOS6®, etc.), a URL range (or top level domain, etc.), a browser type, any metadata (e.g., video codec, user ID, etc.) associated with the application, and so on. In certain embodiments, an administrator of the network can configure which applications, traffic features, and/or network resources are to be monitored. It should be noted that the terms "features", "point features", "feature vectors", "points", "samples", in plural or singular may be used interchangeably in this disclosure. However, all of these terms refer to the same meaning of traffic features observation. The term "center point" has a specific meaning defined in detail herein below.

In an embodiment, the security system 160 is configured to determine if a cyber-attack is being launched upon identification of abnormal traffic behavior. As will be described below, the cyber-attack is determined based on a Mahalanobis distance. In one embodiment, upon detection of abnormal traffic behavior, an alert and/or mitigation action can be triggered. It should be noted that in SDN implementations, some or all of the functions of the security system 160 can be performed by the central controller 111.

Figure 2:
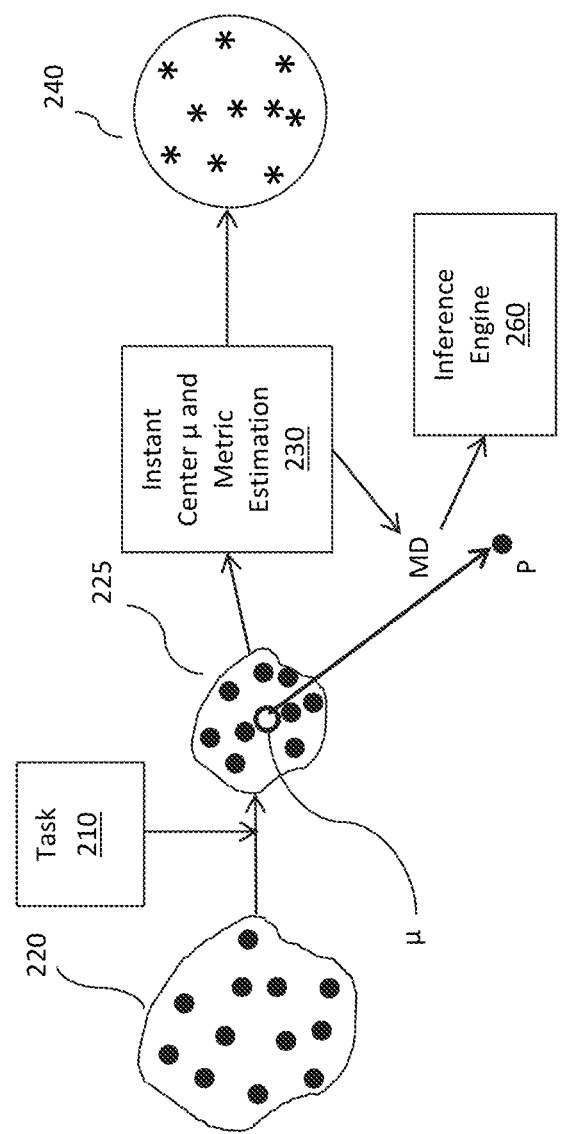
FIG. 2 is a schematic diagram illustrating the operation of the security system in detecting abnormal traffic behavior according to an embodiment.

FIG. 2 is a schematic diagram illustrating the operation of the security system 160 in detecting abnormal traffic behavior according to an embodiment. The monitoring and detection processes are performed respective of a task 210. That is, the task 210 defines a set of traffic features describing an object under monitoring. It should be noted that a plurality of tasks can be processed concurrently without departing from the scope of the disclosed embodiments.

As noted above, usage of ITML and/or iDC-based engines allows monitoring and analysis of network behavior at an application level rather than only at a packet level. That is, all available (or selected) traffic features of a data stream are considered, i.e. all information, from layer-4 to layer-7 (of the OSI model).

The task 210 operates as a filter on an input data set 220 which includes all observed network traffic features, thereby yielding a cluster 225 of a reduced data set for further analysis. As an example, the task 210 may be defined using the following attributes <application-name, OS>. Applying the task 210 on the input data 210 may result in any observation in the traffic of specific applications (e.g., YouTube®, Skype®) and OS type (e.g., iOS® and Android®). The temporal sequence of traffic attributes in the input data 220 is represented as a multi-dimensional cluster of un-normalized random features vectors (points) in an anisotropic space.

Respective of the input data set 220 and the task 210, an instant center point '$\mu$' and metric estimation 230 for the cluster 225 may be performed. In an embodiment, previous observations of traffic features defined in the task 210 are utilized in the instant metric estimation 230. According to the disclosed embodiments, the metric is estimated according to Information Theory Metric Learning (ITML) techniques enhanced by an infinite decaying clusters (iDC) approach (described further hereinafter). The instant center point '$\mu$' and metric estimation 230 virtually transforms the data input 220 (filtered by features defined in the task 210 to the cluster 225 of the filtered observed samples) into a normalized multi-dimensional cluster 240 of features (points) in a random isotropic space. The cluster 240 is in a standard canonical form of a unit variance in any direction. The points in the cluster 240 are in non-dimensional coordinates reduced from traffic features via linear forms with time-dependent instant coefficients. Such coefficients are eventually generated from the inverse covariance matrix of the cluster 225.

In an embodiment, none of the points of the input data 220 are actually transformed, since the estimated metric 230 is needed only for computing a Mahalanobis distance (MD) between a center point '$\mu$' of the cluster 225 and a state point of a new sample 'P' (also subjected by the task 210). The instant center point '$\mu$' and metric estimation 230 is further described with reference to FIGS. 3A and 3B.

An inference engine 260 is configured to compare the Mahalanobis distance (MD) of a newly observed sample with at least one threshold to detect any diversion from normal traffic behavior and to assess threats to the network. For example, if the evaluated Mahalanobis distance is greater than the at least one threshold, an alert is generated. In an embodiment, the at least one threshold may be a predefined or adaptive (learned) threshold. The adaptive threshold is dependent on factual probability density functions of Mahalanobis distance and/or separate coordinates of the Mahalanobis vector, defined as a vector from $\mu$ to P in ITML metric represented by the cluster 225.

Figure 3A:
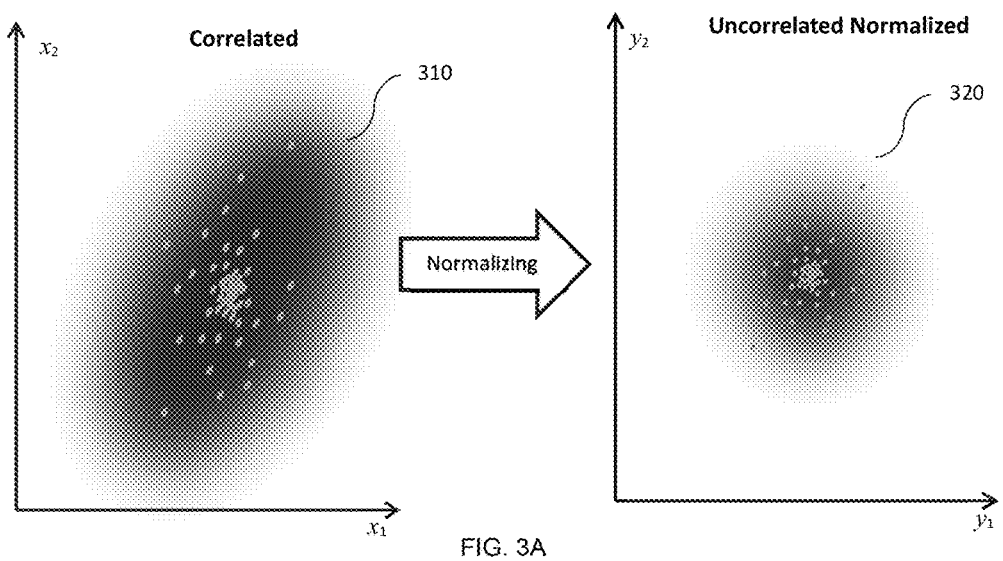
FIGS. 3A and 3B illustrate an instant metric estimation process according to one embodiment.

As illustrated in FIG. 3A, a cluster 310 of the input data set (e.g., cluster 225, FIG. 2) is an un-normalized multi-dimensional cluster of feature vectors (points) with a space where each coordinate represents some traffic feature. The features (coordinates) in the cluster 310 may correlate in some extent. In certain embodiments, the normalization performed by the instant metric estimation 230 process transforms all or some of the feature vectors (points) into an uncorrelated and normalized cluster 320 (240, FIG. 2) of reduced feature vectors that are built from the given features by instant linear forms with coefficients depending on current metric. In other embodiments, as Mahalanobis distance is computed respective of the center point 'μ' of the cluster 310, there is no need to transform the features into the new cluster 320.

Figure 3B:
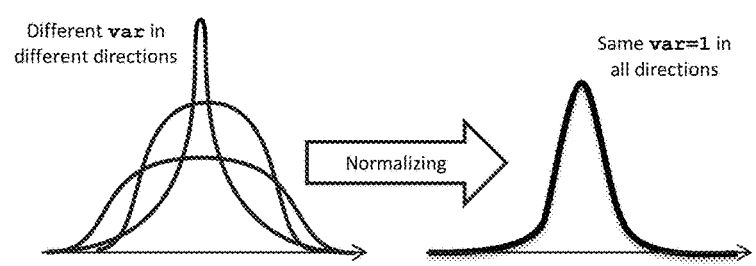

As further illustrated in FIG. 3B, the feature vectors (points) in the cluster 310 are characterized (even when not considering different dimensionality of the features) by a different probability distribution and variance in each different direction of a point. The ITML normalization as performed by the instant metric estimation 230 process, transforms some or all of the original feature vectors (points) into a set of points having a standard isotropic non-dimensional distribution with unit variance. That is, the variance of all points in the normalized cluster 320 is either the same in direction or equal to 1 (i.e., unit variance), thereby providing a stationary random process of new feature vectors additions.

To detect abnormal behavior of network traffic, each new sample (cluster) of traffic features is virtually normalized and compared to a center point μ of a previously learned normalized cluster of traffic features. The comparison is based on a previously computed Mahalanobis distance (MD) between the center point 'μ' and the new sample. The equation for computing the MD is defined herein below in Equation 9. Using the disclosed embodiments, therefore, the detection of abnormal network traffic behavior may be reduced merely to finding the Mahalanobis distance of a new sample. In an embodiment, a direction of a new sample from the center point 'μ' is also identified instead of an estimated ITML metric of the cluster 225. This direction provides additional information on specific misbehavior.

As demonstrated below, the normalized virtual cluster has the same center point 'μ' as the original non-normalized cluster. This fact does not affect the detection of abnormal activity, as only the Mahalanobis distance between the center point and the new observation is utilized for the detection. However, it should be noted that in non-stationary random processes, the center point 'μ' may drift. Specifically, when processing traffic data, there are several normal traffic patterns with different centers 'μ' and different co-existing clusters with their specific metrics. In other words, the feature vectors may be distributed over several separated clusters with different localities and metrics (the number of clusters may be predefined or may be found/chosen, e.g., using a k-means algorithms).

In multi-clustering distribution of the feature vectors, each new observation of a feature vector is checked for its respective Mahalanobis distance from every cluster. If the Mahalanobis distance from one cluster is below the corresponding threshold, then the center point and metric of this cluster is updated. Otherwise, the new observation is classified as misbehavior and ignored for purposes of updating the clusters. In an embodiment, centers of different co-existing clusters can form constellations (i.e., arrangements of points), which in their turn can also be changed with time. Such a change might also indicate on abnormal behavior of a network or other cyberspace under monitoring.

Following is a description for computing the center point 'μ' and the Mahalanobis distance (MD). At the t-th observation, a sample $x_t$ (feature vector) comprising n different features (as defined in task 210) is observed.

$$x_t = (x_{1t} x_{2t} \ldots x_{nt})^T, t=0,1,2,\ldots$$  Eq. (1)

wherein t=0 designates the most recent sample, t=1 is the next most recent sample, and so on. Given 's' samples of a Feature vector:

$$x_t \in \mathfrak{R}^n, t=0,1,\ldots,s-1.$$  Eq. (2)

These 's' samples are arranged as an n×s matrix:

$$X = (x_0 \; x_1 \; \ldots \; x_{s-1}) = \begin{pmatrix} x_{1,0} & x_{1,1} & \ldots & x_{1,s-1} \\ x_{2,0} & x_{2,1} & \ldots & x_{2,s-1} \\ \vdots & \vdots & \ddots & \vdots \\ x_{n,0} & x_{n,1} & \ldots & x_{n,s-1} \end{pmatrix}.$$  Eq. (3)

A growing set of samples X have a transient weighted center point μ:

$$\mu \equiv (\mu_1 \; \mu_2 \; \ldots \; \mu_n)^T = Xw$$  Eq. (4)

$$\equiv (x_0 \; x_1 \; \ldots \; x_{s-1})(w_0 \; w_0 \; \ldots \; w_{s-1})^T = \sum_t w_t x_t$$

$$\equiv \left( \sum_t w_t x_{1t} \; \sum_t w_t x_{2t} \; \ldots \; \sum_t w_t x_{nt} \right)^T,$$

and its random nature is characterized by a weighted covariance matrix S:

$$S = E\{(x_{kt} - \mu_k) w_t (x_{lt} - \mu_l)\} = (X - I\mu) \text{diag}(w)(X - I\mu)^T$$  Eq. (5)

$$= \begin{pmatrix} x_{1,0} - \mu_1 & x_{1,1} - \mu_1 & x_{1,2} - \mu_1 & \ldots \\ x_{2,0} - \mu_2 & x_{2,1} - \mu_2 & x_{2,2} - \mu_2 & \ldots \\ \vdots & \vdots & \vdots & \ddots \\ x_{n,0} - \mu_n & x_{n,1} - \mu_n & x_{n,2} - \mu_n & \ldots \end{pmatrix} \begin{pmatrix} w_0 & 0 & 0 & \ldots \\ 0 & w_1 & 0 & \ldots \\ 0 & 0 & w_2 & \ldots \\ \vdots & \vdots & \vdots & \ddots \end{pmatrix}$$

$$\begin{pmatrix} x_{1,0} - \mu_1 & x_{2,0} - \mu_2 & \ldots & x_{n,0} - \mu_n \\ x_{1,1} - \mu_1 & x_{2,1} - \mu_2 & \ldots & x_{n,1} - \mu_n \\ x_{1,2} - \mu_1 & x_{2,2} - \mu_2 & \ldots & x_{n,2} - \mu_n \\ \vdots & \vdots & \ddots & \vdots \end{pmatrix},$$

where $w_t$ is a decaying weight function in respect to the age of the sample. For example, for an exponential decay with the "half-life" $T_{1/2}$:

$$w_t = \lambda e^{-\lambda t},$$  Eq. (6)

where $$\lambda = \frac{\Delta t}{T_{1/2}} \ln 2 \ll 1$$  Eq. (7)

and Δt is an average time interval between successive observations such that $\Delta t \ll T_{1/2}$. The weight of a sample is halved every $T_{1/2} \approx 0.693 \Delta t / \lambda$ time intervals.

The center point μ typically randomly drifts slightly with each new sample $x_0$. Applying decay with $T_{1/2} \gg \Delta t$, the new center point $\mu_{new}$ may be calculated as an update to the current its value $\mu_{curr}$:

$$\mu_{new} = (1 - \lambda)\mu_{curr} + \lambda x_0$$  Eq. (8)

In one embodiment, the decaying factor λ is assigned manually. In another embodiment, the decaying factor λ is learned based on a plurality of samples (observations) of input times in order to keep some maximal expected value of variance of μ (provided that X(t) is a stationary random process), thereby preventing abrupt jumping of μ.

In an embodiment, the Mahalanobis distance (MD) is computed as follows:

$$MD(X(t)) = \sqrt{(X(t) - \mu)^T S^{-1} (X(t) - \mu)}.$$  Eq. (9)

where X(t) is the current Feature vector, µ is the current center point, and $S^{-1}$ is the inverse covariance matrix.

Using iDC approach and perturbation theory techniques, the $S^{-1}$ matrix can be recursively computed without re-computing or updating the covariance matrix S itself.

Specifically, as the covariance matrices $S_{curr}, S_{new}$ are well-conditioned, then a small perturbation of S, δS, leads also to a small perturbation of $S^{-1}$, $δS^{-1}$ (here, δ is a perturbation operator applied to S and $S^{-1}$, respectively; both δS and $δS^{-1}$ are matrices of the same size as S):

$$S_{new} = S_{curr} + δS \Rightarrow S_{new}^{-1} = S_{curr}^{-1} + δS^{-1}. \quad \text{Eq. (10)}$$

In such assumption, the inverse covariance matrix $S_{new}^{-1}$ can be updated as follows:

$$S_{new}^{-1} = (1+\lambda) S_{curr}^{-1} - \lambda [S_{curr}^{-1}(x_0 - \mu_{new})] S_{curr}^{-1} (x_0 - \mu_{new})]^T. \quad \text{Eq. (11)}$$

The variables of the Equation 11 are defined above.

It should be noted that the recursive computation may result in computational drifts. According to one embodiment, the computational drifts are compensated by periodically performing a complete recalculation of the inverse covariance matrix.

To demonstrate the efficacy of the recursive computation of the inverse covariance matrixes, 4 different network applications, correspondingly, presented by 4 simultaneously observed feature vectors with different original distributions of 5 imaginary random traffic features each, were simulated. The exemplary and non-limiting simulation illustrates that experimental distributions of the Mahalanobis distance and the average Mahalanobis distance value were consistent all the time and were in the range of 1% during long time.

Figure 4:
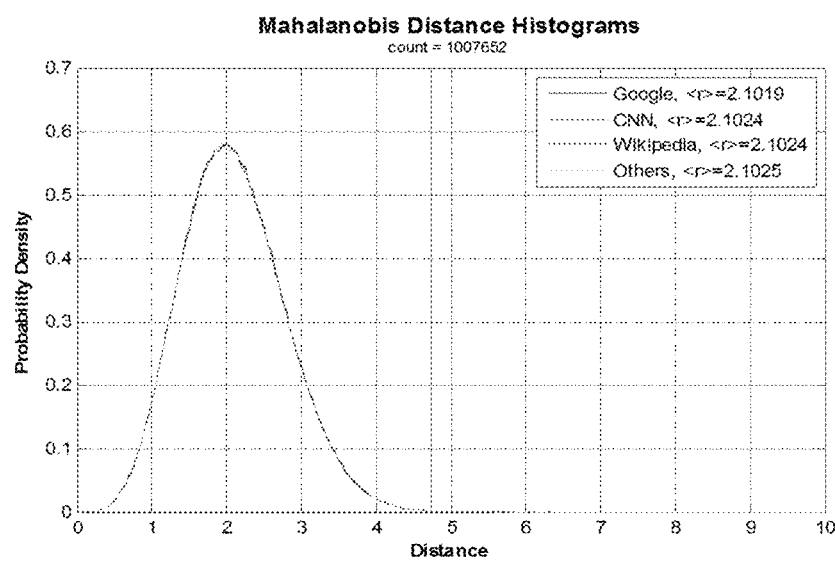
FIG. 4 illustrates simulated distributions of Mahalanobis distance for several simultaneously observed feature vectors.

Theoretically, if n=5, then an average value of MD, <r>=2.12769. Practically, as shown in FIG. 4, after more than one million observations and successive recursive computation cycles, the computed Mahalanobis distance for each of the four simulated vectors were: 2.1019, 2.1024, 2.1024 and 2.1025. It should be appreciated that these computed Mahalanobis distance values demonstrate that there is practically no drift (less than 1% after more than a million recursions).

Figure 5:
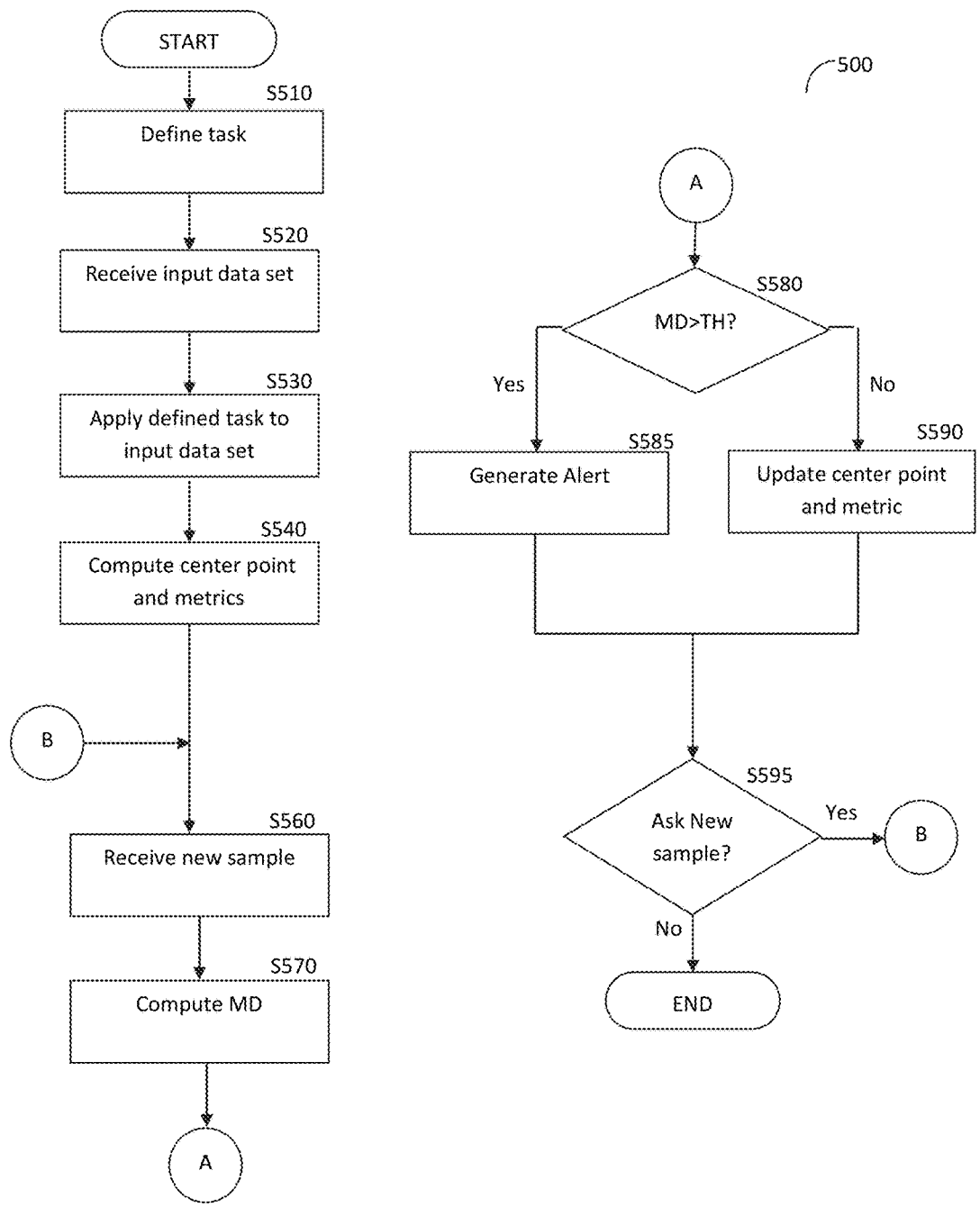
FIG. 5 is a flowchart describing a method for detecting abnormal traffic behavior according to an embodiment.

FIG. 5 is an exemplary and non-limiting flowchart 500 describing a method for detecting abnormal traffic behavior according to an embodiment. At S510, a task is defined as a set of traffic features to be monitored and analyzed. The traffic features are at the application level and may include any feature from layer-4 to layer-7 of the OSI model. Exemplary traffic features include, but are not limited to, packet rate, packets per sec, byte rate, byte per sec, average packet size, new connections rate (new connections per second per application), concurrent connections per application (connections per application), average application flow duration, average application flow size, total number of talking sources per application, total number of talking users per application, data symmetry, an application name or identifier (ID) of the application, an application protocol, a layer-4 (L4) protocol (e.g., TCP, UDP, etc.), a L4 destination port number, a device type, a URL range, a browser type, and any metadata associated with the application.

At S520, an input data set is received. The input data may include all or only selected network features as collected by network entities (e.g., DPI engines, sniffers, etc.). At S530, the defined task is applied to the input data set to filter out values that are not of interest (as determined by the task).

The result of S530 is an un-normalized and correlated cluster of features (see clusters 225 or 310, FIGS. 2 and 3).

At S540, a center point 'µ' of the cluster of features is computed. The equations for computing the center point are described further herein above. In addition, S540 includes estimating metrics of the multi-dimensional space of the cluster for features. The estimation is performed using ITML approaches. As noted above, the features' values form a random vector (Feature Vector) that represents a transient object as a point in multidimensional space, which may be estimated using ITML and iDC approaches. Each new observed sample is a new instance of the feature vector in which its Mahalanobis distance relative to the estimated center point is computed.

At S560, a new sample is received. The new sample may be of values of traffic features defined in the task. The new sample is a new instance of the Feature Vector. At S570, the Mahalanobis distance (MD) between the center point µ and the new sample is computed. The equation for the computing the MD is described further herein above.

At S580, it is checked if the computed MD is above at least one threshold (TH). As discussed above, the threshold may be a predefined or adaptive threshold. If so, execution continues with S585; otherwise, execution continues with S590. The adaptive threshold is dependent on probability density functions of Mahalanobis distance, and may be updated with each new valid sample.

If S580 results with a positive answer, then at S585, an alert is generated. The alert indicates that an abnormal behavior of the traffic attributes is defined in the task. For example, if the traffic features defined in task includes <application_name, number of connection per source>. If the new sample is <Skype, 10000>, which presents a Mahalanobis distance that is greater than a threshold, then the alert may be indicative of a chatty application. In an embodiment, the alert generated at S585 can trigger one or more mitigation functions.

If S580 results with a negative answer, then at S590, a new center point $\mu_{new}$ for the new sample is computed and the multi-dimensional space metric of the cluster of features is recurrently updated without recalculating the full unlimited set of points. This computation allows for updating of the cluster, thereby providing more accurate detections of samples that are outside of the norm. A non-limiting equation for computing the new center point $\mu_{new}$ and the new weighted covariance matrix $S_{new}$ is described further herein above.

At S595, it is checked if another new sample has been received. If so, execution continues with S560; otherwise, execution terminates.

Figure 6:
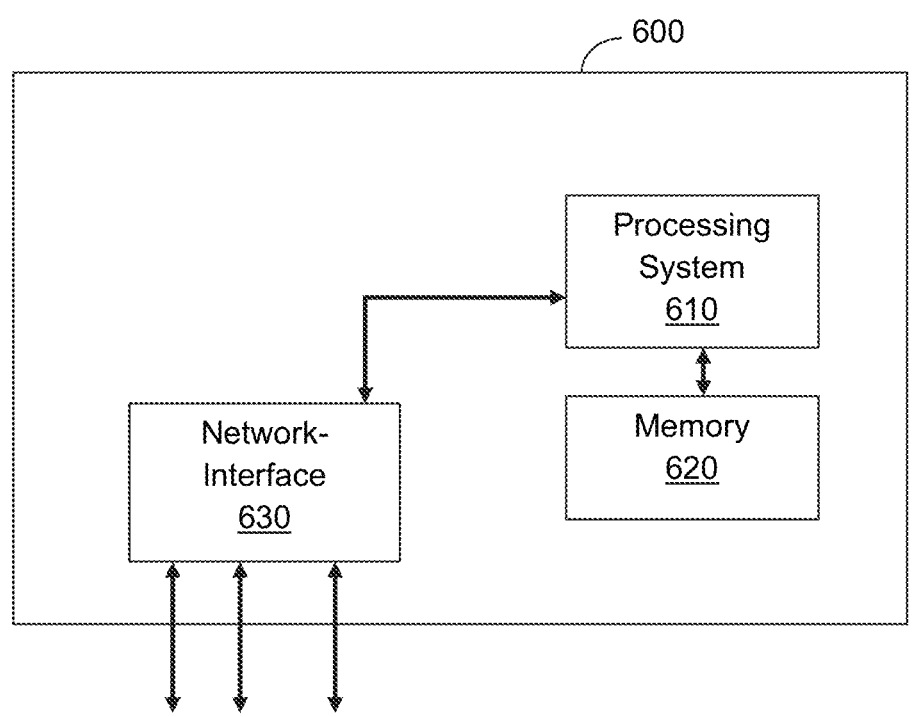
FIG. 6 is a block diagram of a security system according to an embodiment.

FIG. 6 shows an exemplary and non-limiting block diagram of a security system 600 constructed according to an embodiment. The security system 600 includes a processing system 610 coupled to a memory 620 and a network-interface module 630.

The network-interface module 630 is configured to allow communication with various networks (such as edge networks, SDNs, and the like) and to receive samples of observed traffic features from devices, such DPIs, sniffers, tap devices, and the like.

The memory 620 contains instructions that, when executed by the processing system 610, configures the security system to execute tasks generally performed by a security system as well as to control and enable the operation of the processes for detecting abnormal traffic behavior as disclosed herewith. In an embodiment, the processing system 610 may include one or more processors. The one or more processors may be implemented with any combination of general-purpose microprocessors, multi-core processors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The various embodiments discussed herein can be implemented as hardware, firmware, software, or any combination thereof. Moreover, the software is preferably implemented as an application program tangibly embodied on a program storage unit or non-transitory computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the disclosed embodiments and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for detecting abnormal traffic behavior indicative of a cyber-attack, comprising:
    applying a task to an input data set to create an un-normalized cluster of traffic features, wherein the task defines a plurality of traffic features indicative of a potential cyber-attack in a computer network;
    computing a center point of the cluster of traffic features;
    computing a distance between the computed center point and a new sample, wherein the new sample includes traffic features defined in the task, wherein the computed distance is a Mahalanobis distance, wherein the Mahalanobis distance is computed using a metric generated by an information theory metric learning (ITML) engine;
    upon determining that the computed distance is not above a threshold distance, determining that the task defines normal behavior;
    upon determining that the task defines normal behavior, updating the center point and the metric using the new sample;
    determining, based on the computed distance, whether the received new sample demonstrates abnormal behavior of traffic in the computer network;
    when the received new sample demonstrates abnormal behavior of traffic in the computer network, determining if the new sample demonstrating abnormal behavior is indicative of a cyber-attack; and
    upon determining that the abnormal behavior is indicative of a cyber-attack, generating an alert that the new sample is a potential cyber-attack.

2. The method of claim 1, upon determining that the abnormal behavior is indicative of a cyber-attack, triggering at least one mitigation action of traffic in the computer network.

3. The method of claim 1, wherein the cyber-attack is any one of: a denial of service (DoS) attack, a distributed DoS (DDoS) attack, chatty activity, and bot activity.

4. The method of claim 1, wherein the detection of abnormal behavior of traffic in the computer network is performed at an application level.

5. The method of claim 4, wherein the traffic features include information from layer-4 to layer-7 of the Open Systems Interconnection (OSI) model.

6. The method of claim 5, wherein each of the traffic feature is any one of: a packet rate, packets per second, a byte rate, bytes per second, an average packet size, a new connections rate, a concurrent connections per application, an average application flow duration, an average application flow size, a total number of talking sources per application, a total number of talking users per application, a data symmetry, an application name, an application protocol, a Layer-4 destination port number, a device type, a URL range, and a browser type.

7. The method of claim 1, wherein the Mahalanobis distance is computed based on the received new sample, the center point, and an inverse weighted covariance matrix, wherein the inverse weighted covariance matrix is based on a collection of all previously observed samples.

8. The method of claim 7, wherein the inverse weighted covariance matrix is computed by a recursive process.

9. The method of claim 8, further comprising:
    estimating the inverse weighted covariance matrix over all the observed samples using at least an Infinite Decaying Clusters (iDC) engine.

10. The method of claim 7, wherein the weighted covariance matrix employs weights, wherein the weights are decreased based on the age of each sample.

11. A non-transitory computer readable medium having stored thereon instructions for causing one or more processing units to execute a method for detecting abnormal traffic behavior indicative of a cyber-attack comprising:
    applying a task to an input data set to create an un-normalized cluster of traffic features, wherein the task defines a plurality of traffic features indicative of a potential cyber-attack in a computer network;
    computing a center point of the cluster of traffic features;
    computing a distance between the computed center point and a new sample, wherein the new sample includes traffic features defined in the task, wherein the computed distance is a Mahalanobis distance, wherein the Mahalanobis distance is computed using a metric generated by an information theory metric learning (ITML) engine;
    upon determining that the computed distance is not above a threshold distance, determining that the task defines normal behavior;
    upon determining that the task defines normal behavior, updating the center point and the metric using the new sample;

determining, based on the computed distance, whether the received new sample demonstrates abnormal behavior of traffic in the computer network;

when the received new sample demonstrates abnormal behavior of traffic in the computer network, determining if the new sample demonstrating abnormal behavior is indicative of a cyber-attack; and upon determining that the abnormal behavior is indicative of a cyber-attack, generating an alert that the new sample is a potential cyber-attack.

12. A system for detecting abnormal traffic behavior indicative of a cyber-attack, comprising:

a processing unit; and a memory, the memory containing instructions that, when executed by the processing unit, configure the system to:

apply a task to an input data set to create an un-normalized cluster of traffic features, wherein the task defines a plurality of traffic features indicative of a potential cyber-attack in a computer network;

compute a center point of the cluster of traffic features;

compute a distance between the computed center point and a new sample, wherein the new sample includes traffic features defined in the task, wherein the computed distance is a Mahalanobis distance, wherein the Mahalanobis distance is computed using a metric generated by an information theory metric learning (ITML) engine;

upon determining that the computed distance is not above a threshold distance, determine that the task defines normal behavior;

upon determining that the task defines normal behavior, update the center point and the metric using the new sample;

determine, based on the computed distance, whether the received new sample demonstrates abnormal behavior of traffic in the computer network;

when the received new sample demonstrates abnormal behavior of traffic in the computer network, determine if the new sample demonstrating abnormal behavior is indicative of a cyber-attack; and upon determining that the abnormal behavior is indicative of a cyber-attack, generate an alert that the new sample is a potential cyber-attack.

13. The system of claim 12, wherein upon determining that the abnormal behavior is indicative of a cyber-attack the system is further configured to:

trigger at least one mitigation action of traffic in the computer network.

14. The system of claim 12, wherein the cyber-attack is any one of: a denial of service (DoS) attack, a distributed DoS (DDoS) attack, chatty activity, and bot activity.

15. The system of claim 12, wherein the detection of abnormal behavior of traffic in the computer network is performed at an application level.

16. The system of claim 15, wherein the traffic features include information from layer-4 to layer-7 of the Open Systems Interconnection (OSI) model.

17. The system of claim 16, wherein each of the traffic feature is any one of: a packet rate, packets per second, a byte rate, bytes per second, an average packet size, a new connections rate, a concurrent connections per application, an average application flow duration, an average application flow size, a total number of talking sources per application, a total number of talking users per application, a data symmetry, an application name, an application protocol, a Layer-4 destination port number, a device type, a URL range, and a browser type.

18. The system of claim 12, wherein the Mahalanobis distance is computed based on the received new sample, the center point, and an inverse weighted covariance matrix, wherein the inverse weighted covariance matrix is based on a collection of all previously observed samples.

19. The system of claim 18, wherein the inverse weighted covariance matrix is computed by a recursive process.

20. The system of claim 19, wherein the system is further configured to:

estimate the inverse weighted covariance matrix over all the observed samples using at least an Infinite Decaying Clusters (iDC) engine.

21. The system of claim 18, wherein the weighted covariance matrix employs weights, wherein the weights are decreased based on the age of each sample.

* * * * *